US012388275B2

(12) United States Patent
Xiao et al.

(10) Patent No.: US 12,388,275 B2
(45) Date of Patent: Aug. 12, 2025

(54) CHARGING/DISCHARGING OVERCURRENT PROTECTION CIRCUIT AND OVERCURRENT PROTECTION METHOD THEREFOR

(71) Applicant: Shenzhen Injoinic Technology Co., Ltd., Shenzhen (CN)

(72) Inventors: Chuan Xiao, Shenzhen (CN); Fengmin Xie, Shenzhen (CN)

(73) Assignee: Shenzhen Injoinic Technology Co., Ltd., Shenzhen (CN)

( * ) Notice: Subject to any disclaimer, the term of this patent is extended or adjusted under 35 U.S.C. 154(b) by 764 days.

(21) Appl. No.: 17/776,212

(22) PCT Filed: Jul. 14, 2020

(86) PCT No.: PCT/CN2020/101926
§ 371 (c)(1),
(2) Date: Nov. 3, 2022

(87) PCT Pub. No.: WO2021/093357
PCT Pub. Date: May 20, 2021

(65) Prior Publication Data
US 2023/0065691 A1    Mar. 2, 2023

(30) Foreign Application Priority Data

Nov. 11, 2019 (CN) .......................... 201911095415.0
Nov. 11, 2019 (CN) .......................... 201921942910.6

(51) Int. Cl.
*H02J 7/00*    (2006.01)
*H02H 7/18*    (2006.01)

(52) U.S. Cl.
CPC .......... *H02J 7/00304* (2020.01); *H02H 7/18* (2013.01); *H02J 7/0024* (2013.01); *H02J 7/0048* (2020.01)

(58) Field of Classification Search
USPC .................................................. 320/134–136
See application file for complete search history.

(56) References Cited

U.S. PATENT DOCUMENTS

| 8,687,338 B2* | 4/2014 | Odaohhara ........... H02J 7/0031 429/61 |
| 2002/0079865 A1* | 6/2002 | Thomas ................ H02H 9/042 320/136 |

(Continued)

FOREIGN PATENT DOCUMENTS

| CN | 202014087 Y | 10/2011 |
| CN | 110752641 P | 2/2020 |

(Continued)

*Primary Examiner* — Samuel Berhanu
(74) *Attorney, Agent, or Firm* — IPRO, PLLC (57) ABSTRACT

A charging/discharging overcurrent protection circuit and method. The circuit includes: an internal resistance sensing module, for sensing total internal resistance of serial charge/discharge switch transistors according to a preconfigured ratio in a charging/discharging state; a voltage selection module, connected to the internal resistance sensing module, for switching between different links according to a voltage gating switch so as to be connected to the internal resistance sensing module, to output a charging detection voltage and a charging reference voltage in a charging state, and output a discharging detection voltage and a discharging reference voltage in a discharging state; and an overcurrent signal generation module, connected to the voltage selection module, for switching between different inputs according to an input gating switch so as to generate a charging/discharging overcurrent protection signal according to a comparison result. The present disclosure resolves many problems caused by a precision resistor R0 in battery protection systems.

10 Claims, 2 Drawing Sheets

(56) References Cited

U.S. PATENT DOCUMENTS

2005/0242779 A1\* 11/2005 Yoshio .................. H02H 3/044
                                                                             320/134
2005/0269992 A1    12/2005 Lai et al.

FOREIGN PATENT DOCUMENTS

| CN | 210867232 P | 6/2020 |
|---|---|---|
| JP | 2005168159 Y | 6/2005 |

\* cited by examiner

CHARGING/DISCHARGING OVERCURRENT PROTECTION CIRCUIT AND OVERCURRENT PROTECTION METHOD THEREFOR

TECHNICAL FIELD

The present disclosure relates to battery charging and discharging technology, especially to a charging/discharging overcurrent protection circuit and an overcurrent protection method therefor.

BACKGROUND

Batteries are increasingly used in a wide range of applications, from portable devices such as mobile phones, personal wearable systems, GPS and toys to gas meters that require continuous data storage. The battery market size has reached several hundred million units per month. And in order to prevent a battery from being damaged by abnormal conditions such as excessive charging current and excessive discharging current, it is usually necessary to provide battery overcurrent protection to prevent the battery from being damaged by abnormally high current.

Figure 1:
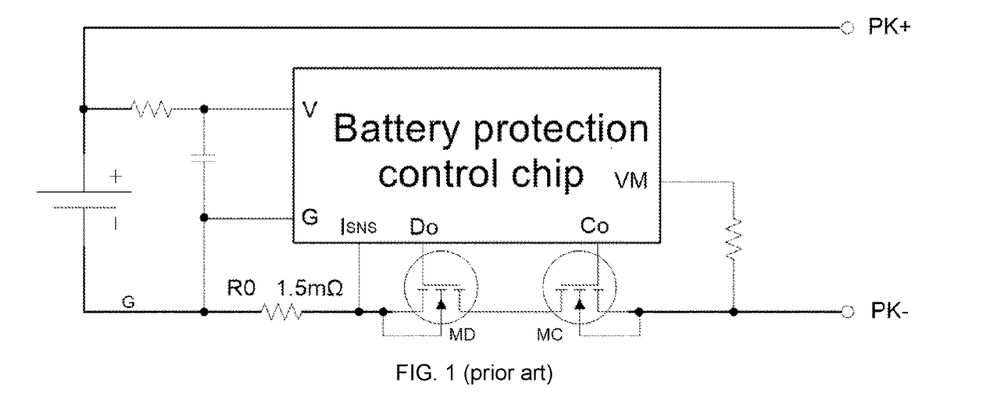
FIG. 1 shows a schematic diagram of a battery protection system in the prior art.

A traditional battery protection system against charging/discharging overcurrent is generally shown in FIG. 1, and is mainly realized by a control IC, an external discharge switch transistor MD, a charge switch transistor MC, and a precision resistor RO; when a charger is connected to the PK+/PK− end to charge the battery normally, both MD and MC are on, and when the control IC detects abnormal charging voltage and current, the MC will be controlled to be turned off to terminate the charging; When the PK+/PK− end is connected to a load to discharge the battery normally, both MD and MC are on, and when the control IC detects abnormal discharge voltage and current, the MD will be controlled to be turned off to terminate the discharging.

In order to achieve accurate charging/discharging overcurrent protection, in the battery protection system as shown in FIG. 1, an RO precision resistor is connected in series throughout the high current path to detect any high current in the charging/discharging circuit. Although this method can realize charging/discharging-overcurrent protection, it also directly leads to defects such as increased impedance in the charging/discharging circuit, higher cost, and poor integration. At the same time, RO precision resistors tend to have very small resistance values in actual use, usually 2mΩ, or 1mΩ. With such a small resistance value, requirements for the welding process and PCB board design are greatly heightened. Welding abnormalities or poor design considerations can cause excessive contact resistance to the RO precision resistor, which in turn can seriously affect the resistance value of the precision resistor, resulting in insufficient accuracy of the protection current and PCB heating and other problems.

With the high-capacity and high-current demand of portable devices (e.g., 5G mobile phones), the difference between the normal high-current charging/discharging current values and the overcurrent protection threshold is becoming smaller. Compared with the past 3G or 4G mobile phones, new and higher requirements for the safety and precision of the battery protection system have been put forward; therefore, how to eliminate precision resistors, integrate the precise overcurrent protection function inside the chip and realize the precise charging/discharging overcurrent protection function during the charging/discharging process at low cost is an urgent technical problem for chip design technicians in this field.

SUMMARY

The present disclosure provides a charging/discharging overcurrent protection circuit and an overcurrent protection method therefor.

The charging/discharging overcurrent protection circuit includes:

an internal resistance sensing module, connected to two ends of a charge switch transistor and a discharge switch transistor connected in series in the battery protection system, for sensing a total internal resistance of the charge switch transistor and the discharge switch transistor connected in series according to a preconfigured ratio when the battery is in a charging state, and sensing a total internal resistance of the charge switch transistor and the discharge switch transistor connected in series according to a preconfigured ratio when the battery is in a discharging state;

a voltage selection module, connected to the internal resistance sensing module, for switching between different links based on a voltage gating switch so as to be connected to the internal resistance sensing module, to output a charging detection voltage and a charging reference voltage when the battery is in a charging state, and output a discharging detection voltage and a discharging reference voltage when the battery is in a discharging state; where the charging detection voltage is generated when the charging current flows through the charge switch transistor and the discharge switch transistor connected in series, the charging reference voltage is the sum of a voltage generated when a first bias current flows through the internal resistance sensing module and the voltage at the battery charging/discharging negative electrode end, the discharging detection voltage is generated when the discharging current flows through the charge switch transistor and the discharge switch transistor connected in series, and the discharging reference voltage is generated when the second bias current flows through the internal resistance sensing module; and an overcurrent signal generation module, connected to the voltage selection module, for switching between different inputs based on an input gating switch, so as to compare the charging detection voltage with the charging reference voltage when the battery is in a charging state, and generate a charging overcurrent protection signal when the charging detection voltage is not less than the charging reference voltage; and to compare the discharging detection voltage with the discharging reference voltage when the battery is in a discharging state, and generate a discharging overcurrent protection signal when the discharging detection voltage is not less than the discharging reference voltage.

Optionally, the internal resistance sensing module includes: N series-connected charging internal resistance sensing transistors connected to the charge switch transistor, and M series-connected discharging internal resistance sensing transistors connected to the discharge switch transistor; where the charging internal resistance sensing transistors are also connected in series with the discharging internal resistance sensing transistors; where the ratio of the width of the charging internal resistance sensing transistor to that of the charge switch transistor is 1/K1, the ratio of the width of the discharging internal resistance sensing transistor to that of the discharge switch transistor is 1/K2, and N, M, K1, and K2 are all positive numbers greater than or equal to 1.

Optionally, the number of the charging internal resistance sensing transistors is the same as that of the discharging internal resistance sensing transistors.

Optionally, the ratio of the width of the charging internal resistance sensing transistor to that of the charge switch transistor is the same as the ratio of the width of the discharging internal resistance sensing transistor to that of the discharge switch transistor.

Optionally, the voltage selection module includes: a first voltage gating switch, a second voltage gating switch, a first bias current source, and a second bias current source; a fixed end of the first voltage gating switch is connected to the internal resistance sensing module, and a first gating end of the first voltage gating switch is connected to one end of the first bias current source and also serves as a first output end of the voltage selection module to output the charging reference voltage. A second gating end of the first voltage gating switch is grounded and also serves as a second output end of the voltage selection module to output the charging detection voltage. The other end of the first bias current source is grounded. A fixed end of the second voltage gating switch is connected to the internal resistance sensing module. A first gating end of the second voltage gating switch is connected to one end of the second bias current source and also serves as a third output end of the voltage selection module to output the discharging reference voltage. A second gating end of the second voltage gating switch is connected to the charging/discharging negative electrode end of the battery and also serves as a fourth output end of the voltage selection module to output the discharging detection voltage. The other end of the second bias current source is grounded.

Optionally, the overcurrent signal generation module includes: a first input gating switch, a second input gating switch, and a comparator; a fixed end of the first input gating switch is connected to a first input end of the comparator, a first gating end of the first input gating switch is connected to a second output end of the voltage selection module, a second gating end of the first input gating switch is connected to a third output end of the voltage selection module, a fixed end of the second input gating switch is connected to a second input end of the comparator, a first gating end of the second input gating switch is connected to a first output end of the voltage selection module, a second gating end of the second input gating switch is connected to a fourth output end of the voltage selection module, an output end of the comparator being an output end of the overcurrent signal generation module.

The present disclosure further provides a charging/discharging overcurrent protection method implemented using the charging/discharging overcurrent protection circuit as described above, and the charging/discharging overcurrent protection method includes:

when the battery is in a charging state, sensing, via an internal resistance sensing module, the sum of the internal resistances of the charge switch transistor and the discharge switch transistor connected in series according to a preconfigured ratio; switching, via a voltage selection module, between different links based on a voltage gating switch, to output a charging detection voltage and a charging reference voltage; switching, via an overcurrent signal generation module, between different inputs based on an input gating switch, so as to compare the charging detection voltage with the charging reference voltage, and generate a charging overcurrent protection signal when the charging detection voltage is not less than the charging reference voltage;

when the battery is in a discharging state, sensing, via the internal resistance sensing module, the sum of the internal resistances of the charge switch transistor and the discharge switch transistor connected in series according to a preconfigured ratio; switching, via the voltage selection module, between different links based on a voltage gating switch, to output a discharging detection voltage and a discharging reference voltage; switching, via the overcurrent signal generation module, between different inputs based on an input gating switch, so as to compare the discharging detection voltage with the discharging reference voltage, and generate a discharging overcurrent protection signal when the discharging detection voltage is not less than the discharging reference voltage.

Optionally, when the battery is in a charging state or a discharging state, the sum of internal resistances sensed by the internal resistance sensing module is given by $Ron\_sns = N*Ron\_MCsns + M*Ron\_MDsns = N*K1*Ron\_MC + M*K2*Ron\_MD$; where N is the number of charging internal resistance sensing transistors, M is the number of discharging internal resistance sensing transistors, $Ron\_MCsns$ is the internal resistance of a single charging internal resistance sensing transistor, $Ron\_MDsns$ is the internal resistance of a single discharging internal resistance sensing transistor, K1 is the ratio of the width of the charge switch transistor to that of the charging internal resistance sensing transistor, K2 is the ratio of the width of the discharge switch transistor to that of the discharging internal resistance sensing transistor, $Ron\_MC$ is the internal resistance of the charge switch transistor, and $Ron\_MD$ is the internal resistance of the discharge switch transistor.

Optionally, when the battery is in the charging state, the charging reference voltage $Vref\_C = ICset*Ron\_sns + VPK- = ICset*(N*K1*Ron\_MC + M*K2*Ron\_MD) + VPK-$; when the battery is in the discharging state, the discharging reference voltage $Vref\_D = IDset*Ron\_sns = IDset*(N*K1*Ron\_MC + M*K2*Ron\_MD)$; where the ICset is a current provided by the first bias current source, and the IDset is a current provided by the second bias current source, $Ron\_sns$ is the sum of the internal resistances sensed by the internal resistance sensing module, VPK- is a voltage at the charging/discharging negative electrode end of the battery, N is the number of charging internal resistance sensing transistors, M is the number of discharging internal resistance sensing transistors, K1 is the ratio of the width dimension of the charge switch transistor to the charging internal resistance sensing transistor, K2 is the ratio of the width dimension of the discharge switch transistor to the discharging internal resistance sensing transistor, $Ron\_MC$ is the internal resistance of the charge switch transistor, and $Ron\_MD$ is the internal resistance of the discharge switch transistor.

Optionally, when the battery is in the charging state, the charging overcurrent protection threshold $IOverChg = ICset*(N*K1*Ron\_MC + M*K2*Ron\_MD)/(Ron\_MC + Ron\_MD)$; when the battery is in the discharging state, the discharging overcurrent protection threshold is given by $IOverDisChg = IDset*(N*K1*Ron\_MC + M*K2*Ron\_MD)/(Ron\_MC + Ron\_MD)$; where the ICset is a current provided by the first bias current source, and the IDset is a current provided by the second bias current source, N is the number of charging internal resistance sensing transistors, M is the number of discharging internal resistance sensing transistors, K1 is the ratio of the width dimension of the charge switch transistor to the charging internal resistance sensing transistor, K2 is the ratio of the width dimension of the discharge switch transistor to the discharging internal resistance sensing transistor, Ron_MC is the internal resistance of the charge switch transistor, and Ron_MD is the internal resistance of the discharge switch transistor.

In summary, the present disclosure provides a charging/discharging overcurrent protection circuit and an overcurrent protection method therefor, which can detect overcurrents both during the charging and the discharging processes of the battery, and realize the overcurrent protection for both the charging and discharging processes. During the overcurrent detection process, the present disclosure makes use of the working principle of the battery protection system and its own characteristics (i.e., during the high-current application, the charge switch transistor and the discharge switch transistor connected in series in the battery protection system are always in a conduction state at the same time) to detect the current of the series-connected charge switch transistor and discharge switch transistor as a whole, and to accurately sense, using an internal resistance sensing module composed of series-connected charging internal resistance sensing transistors and discharging internal resistance sensing transistors, the different internal resistances of the serial charging and discharge switch transistors integrated on the same wafer due to varying factors such as drive voltage, temperature, and process variations. A reference voltage generated by a preset and accurate built-in bias current flowing through the internal resistance sensing module serves as a comparison voltage for overcurrent detection, thereby exponentially increasing the magnitude of the detection voltage and facilitating the requirement for higher precision current detection. At the same time, by using the same internal resistance sensing module in the two states of charging and discharging, the current detection protection for the two states of charging and discharging can be realized through switching and simple logic control, which greatly saves the chip area occupied by the internal resistance sensing module; moreover, the present disclosure uses internal resistance sensing instead of current sensing, which further simplifies the design and saves cost. Moreover, in practical application, the internal resistance sensing module, the voltage selection module and the overcurrent signal generation module of the charging/discharging overcurrent protection circuit described in the present disclosure can be integrated on the same wafer as the charge/discharge switch transistors in the battery protection system, thereby reducing the size of the PCB and improving the system integration, which in turn improves the production efficiency of the battery protection system. It can be seen that the charging/discharging overcurrent protection circuit described in the present disclosure has high integration, occupies small space inside the battery, has few peripheral devices, has good performance and high precision, and can better meet the demand for high battery safety under the current situation of large battery capacity and high charging/discharging current.

| Description of reference numerals | |
| --- | --- |
| 100 | Internal resistance sensing module |
| 200 | Voltage selection module |
| 300 | Overcurrent signal generation module |

DETAILED DESCRIPTION

The embodiments of the present disclosure will be described below through exemplary embodiments. Those skilled in the art can easily understand other advantages and effects of the present disclosure according to contents disclosed by the specification. The present disclosure can also be implemented or applied through other different exemplary embodiments. Various modifications or changes can also be made to all details in the specification based on different points of view and applications without departing from the spirit of the present disclosure.

Figure 2:
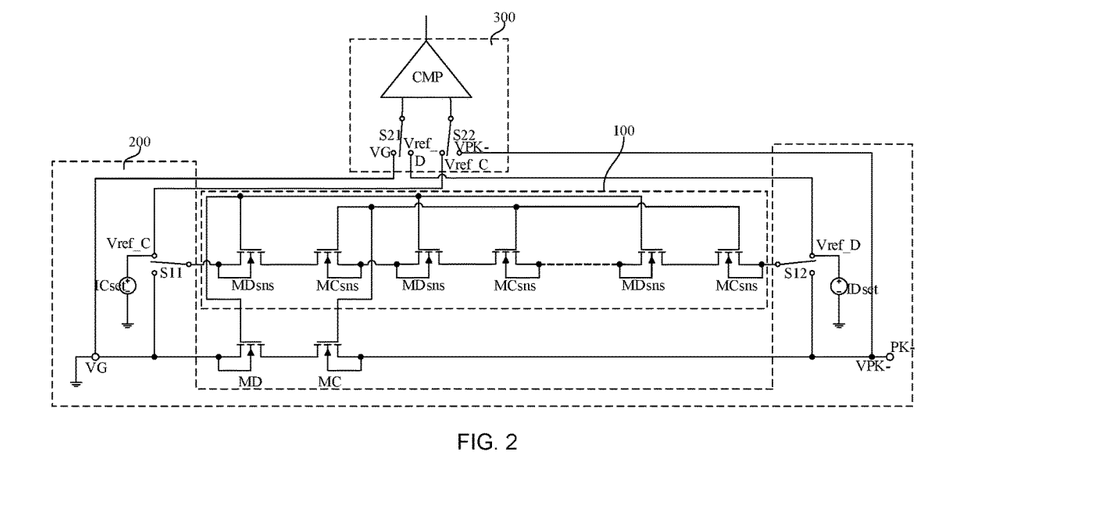
FIG. 2 shows a schematic diagram of the charging/discharging overcurrent protection circuit of the present disclosure.
Figure 3:
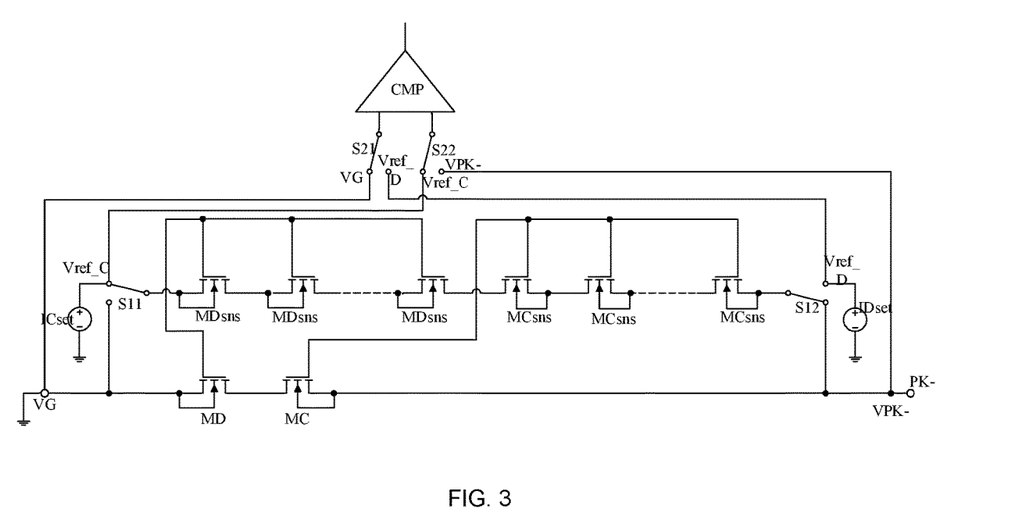
FIG. 3 shows a schematic diagram of the charging/discharging overcurrent protection circuit of the present disclosure in the charging state.
Figure 4:
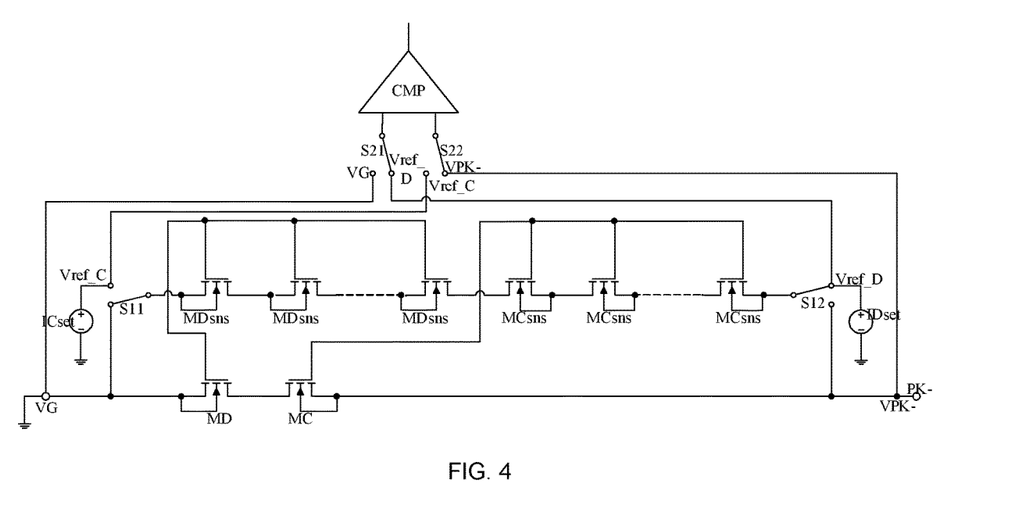
FIG. 4 shows a schematic diagram of the charging/discharging overcurrent protection circuit of the present disclosure in the discharging state.

Please refer to FIGS. 2-4. It needs to be stated that the drawings provided in the following embodiments are only used for schematically describing the basic concept of the present disclosure, thus only illustrating components related to the present disclosure and are not drawn according to the numbers, shapes and sizes of components during actual implementation, the configuration, number and scale of each component during actual implementation thereof may be freely changed, and the component layout configuration thereof may be more complex.

As shown in FIG. 2, the present disclosure provides a charging/discharging overcurrent protection circuit, which includes:

an internal resistance sensing module 100, connected to two ends of a charge switch transistor MC and a discharge switch transistor MD connected in series in the battery protection system, for sensing a total internal resistance of the charge switch transistor MC and the discharge switch transistor MD connected in series according to a preconfigured ratio when the battery is in a charging state, and sensing a total internal resistance of the charge switch transistor MC and the discharge switch transistor MD connected in series according to a preconfigured ratio when the battery is in a discharging state;

a voltage selection module 200, connected to the internal resistance sensing module 100, for switching between different links according to a voltage gating switch so as to be connected to the internal resistance sensing module 100, to output a charging detection voltage VG and a charging reference voltage Vref_C when the battery is in a charging state, and output a discharging detection voltage VPK− and a discharging reference voltage Vref_D when the battery is in a discharging state; where the charging detection voltage VG is generated when the charging current flows through the charge switch transistor MC and the discharge switch transistor MD connected in series, the charging reference voltage Vref_C is the sum of a voltage generated when a first bias current ICset flows through the internal resistance sensing module 100 and the voltage VPK− at the battery charging/discharging negative electrode end, the discharging detection voltage VPK− is generated when the discharging current flows through the charge switch transistor MC and the discharge switch transistor MD connected in series, the discharging reference voltage Vref_D is generated when the second bias current IDset flows through the internal resistance sensing module 100; and an overcurrent signal generation module 300, connected to the voltage selection module 200, for switching between different inputs according to an input gating switch, so as to compare the charging detection voltage VG with the charging reference voltage Vref_C when the battery is in a charging state, and generate a charging overcurrent protection signal when the charging detection voltage VG is not less than the charging reference voltage Vref_C; and to compare the discharging detection voltage VPK− with the discharging reference voltage Vref_D when the battery is in a discharging state, and generate a discharging overcurrent protection signal when the discharging detection voltage VPK− is not less than the discharging reference voltage Vref_D.

In one example, the first bias current ICset is a current provided by a first bias current source, the magnitude of which is related to a charging overcurrent protection threshold; the second bias current IDset is a current provided by a second bias current source, the magnitude of which is related to a discharging overcurrent protection threshold.

As an example, as shown in FIG. 2, the internal resistance sensing module 100 includes: N series-connected charging internal resistance sensing transistors MCsns connected to the charge switch transistor MC and M series-connected discharging internal resistance sensing transistors MDsns connected to the discharge switch transistor MD; where the charging internal resistance sensing transistors MCsns and the discharging internal resistance sensing transistors MDsns are connected in series; where the ratio of the width of the charging internal resistance sensing transistors MCsns to that of the charge switch transistor MC is 1/K1, the ratio of the width of the discharging internal resistance sensing transistors MDsns to that of the discharge switch transistor MD is 1/K2, and N, M, K1, and K2 are all positive numbers greater than or equal to 1.

In one example, when the battery is in the charging state, both the charge switch transistor MC and the discharge switch transistor MD are in a conduction state, at which time the charging internal resistance sensing transistors MCsns are used to sense the internal resistance of the charge switch transistor MC, and the discharging internal resistance sensing transistors MDsns are used to sense the internal resistance of the discharge switch transistor MD; when the battery is in the discharging state, both the charge switch transistor MC and the discharge switch transistor MD are in a conduction state, at which time the charge internal resistance sensing transistors MCsns are used to sense the internal resistance of the charge switch transistor MC, and the discharge internal resistance sensing transistors MDsns are used to sense the internal resistance of the discharge switch transistor MD. It should be noted that since the same internal resistance sensing module is used when the battery is in charging state and in discharging state, the preconfigured ratio involved in the charging state is the same as the preconfigured ratio involved in the discharging state, and both ratios are related to K1 and K2. Some parameters such as on-resistance of a MOS transistor will increase by a factor of K1 and K2 after its width is decreased proportionally by a factor of K1 and K2. Optionally, in one example, the charge switch transistor MC, the discharge switch transistor MD, the charging internal resistance sensing transistors MCsns and the discharging internal resistance sensing transistors MDsns are all NMOS transistors.

Optionally, in one example, the number of the charging internal resistance sensing transistors MC_sns is the same as that of the discharging internal resistance sensing transistors MD_sns, i.e., N=M; the ratio of the width of the charging internal resistance sensing transistors MCsns to that of the charge switch transistor MC is the same as the ratio of the width of the discharging internal resistance sensing transistors MDsns to that of the discharge switch transistor MD, i.e., K1=K2.

As an example, as shown in FIG. 2, the voltage selection module 200 includes: a first voltage gating switch S11, a second voltage gating switch S12, a first bias current source, and a second bias current source; a fixed end of the first voltage gating switch S11 is connected to the internal resistance sensing module 100, and a first gating end of the first voltage gating switch S11 is connected to one end of the first bias current source and also serves as a first output end of the voltage selection module 200 to output the charging reference voltage Vref_C. A second gating end of the first voltage gating switch S11 is grounded and also serves as a second output end of the voltage selection module 200 to output the charging detection voltage VG. The other end of the first bias current source is grounded. A fixed end of the second voltage gating switch S12 is connected to the internal resistance sensing module 100. A first gating end of the second voltage gating switch S12 is connected to one end of the second bias current source and also serves as a third output end of the voltage selection module 200 to output the discharging reference voltage Vref_D. A second gating end of the second voltage gating switch S12 is connected to the charging/discharging negative electrode end PK− of the battery and also serves as a fourth output end of the voltage selection module 200 to output the discharging detection voltage VPK−. The other end of the second bias current source is grounded.

In one example, when the battery is in the charging state, the fixed end of the first voltage gating switch S11 is connected to the first gating end of the first voltage gating switch S11, and the fixed end of the second voltage gating switch S12 is connected to the second gating end of the second voltage gating switch S12, so that the voltage selection module 200 outputs the charging detection voltage VG and the charging reference voltage Vref_C (see FIG. 3 for details). When the battery is in the discharging state, the fixed end of the first voltage gating switch S11 is connected to the second gating end of the first voltage gating switch S11, and the fixed end of the second voltage gating switch S12 is connected to the first gating end of the second voltage gating switch S12, so that the voltage selection module 200 outputs the discharging detection voltage VPK− and the discharging reference voltage Vref_D (see FIG. 4 for details).

As an example, as shown in FIG. 2, the overcurrent signal generation module 300 includes: a first input gating switch S21, a second input gating switch S22, and a comparator CMP; a fixed end of the first input gating switch S21 is connected to a first input end of the comparator CMP, a first gating end of the first input gating switch S21 is connected to a second output end of the voltage selection module 200, a second gating end of the first input gating switch S21 is connected to a third output end of the voltage selection module 200, a fixed end of the second input gating switch S22 is connected to a second input end of the comparator CMP, a first gating end of the second input gating switch S22 is connected to a first output end of the voltage selection module 200, a second gating end of the second input gating switch S22 is connected to a fourth output end of the voltage selection module 200, an output end of the comparator CMP being an output end of the overcurrent signal generation module 300.

In one example, when the battery is in the charging state, the first input end of the comparator CMP is connected to the second output end of the voltage selection module 200 (i.e. charging detection voltage VG), and the second input end of the comparator CMP is connected to the first output end of the voltage selection module 200 (i.e. charging reference voltage Vref_C), thereby enabling the comparison of the charging detection voltage VG with the charging reference voltage Vref_C and generating a charging overcurrent protection signal when the charging detection voltage VG is not less than the charging reference voltage Vref_C (see FIG. 3 for details). When the battery is in the discharging state, the first input end of the comparator CMP is connected to the third output end of the voltage selection module 200 (i.e. discharging reference voltage Vref_D), and the second input end of the comparator CMP is connected to the fourth output end of the voltage selection module 200 (i.e. discharging detection voltage VPK−), thus enabling comparison of the discharging detection voltage VPK− with the discharging reference voltage Vref_D and generating a discharging overcurrent protection signal when the discharging detection voltage VPK− is not less than the discharging reference voltage Vref_D (see FIG. 4 for details).

The present disclosure further provides a charging/discharging-overcurrent protection method implemented using the charging/discharging overcurrent protection circuit as described above, and the charging/discharging-overcurrent protection method includes:

when the battery is in a charging state, sensing, via an internal resistance sensing module 100, the sum of the internal resistances of the charge switch transistor MC and the discharge switch transistor MD connected in series according to a preconfigured ratio; switching, via a voltage selection module 200, between different links based on a voltage gating switch, to output a charging detection voltage VG and a charging reference voltage Vref_C; switching, via an overcurrent signal generation module 300, between different inputs based on an input gating switch, so as to compare the charging detection voltage VG with the charging reference voltage Vref_C, and generate a charging overcurrent protection signal when the charging detection voltage VG is not less than the charging reference voltage Vref_C;

when the battery is in a discharging state, sensing, via the internal resistance sensing module 100, the sum of the internal resistances of the charge switch transistor MC and the discharge switch transistor MD connected in series according to a preconfigured ratio; switching, via the voltage selection module 200, between different links based on a voltage gating switch, to output a discharging detection voltage VPK− and a discharging reference voltage Vref_D; switching, via the overcurrent signal generation module 300, between different inputs based on an input gating switch, so as to compare the discharging detection voltage VPK− with the discharging reference voltage Vref_D, and generate a discharging overcurrent protection signal when the discharging detection voltage VPK− is not less than the discharging reference voltage Vref_D.

As an example, when the battery is in the charging state or the discharging state, the sum of internal resistance sensed by the internal resistance sensing module 100 is given by $Ron\_sns = N*Ron\_MCsns + M*Ron\_MDsns = N*K1*Ron\_MC + M*K2*Ron\_MD$; where N is the number of charging internal resistance sensing transistors, M is the number of discharging internal resistance sensing transistors, Ron_MCsns is the internal resistance of a single charging internal resistance sensing transistor, Ron_MDsns is the internal resistance of a single discharging internal resistance sensing transistor, K1 is the ratio of the width of the charge switch transistor to that of the charging internal resistance sensing transistor, K2 is the ratio of the width of the discharge switch transistor to that of the discharging internal resistance sensing transistor, Ron_MC is the internal resistance of the charge switch transistor, and Ron_MD is the internal resistance of the discharge switch transistor.

Specifically, when the battery is in the charging state or the discharging state, both the charge switch transistor MC and the discharge switch transistor MD are in a conduction state, at which time the charging internal resistance sensing transistors MCsns are used to sense the internal resistance of the charge switch transistor MC, and the discharging internal resistance sensing transistors MDsns are used to sense the internal resistance of the discharge switch transistor MD; where the sensed internal resistance of the N charging internal resistance sensing transistors MCsns is $N*Ron\_MCsns = N*K1*Ron\_MC$, and the sensed internal resistance of the M discharge internal resistance sensing transistors MDsns is $M*Ron\_MDsns = M*K2*Ron\_MD$, therefore, the total internal resistance sensed by the internal resistance sensing module 100 is given by $Ron\_sns = N*Ron\_MCsns + M*Ron\_MDsns = N*K1*Ron\_MC + M*K2*Ron\_MD$.

As an example, when the battery is in the charging state, the charging reference voltage $Vref\_C = ICset*Ron\_sns + VPK- = ICset*(N*K1*Ron\_MC + M*K2*Ron\_MD) + VPK-$; when the battery is in the discharging state, the discharging reference voltage $Vref\_D = IDset*Ron\_sns = IDset*(N*K1*Ron\_MC + M*K2*Ron\_MD)$, where the ICset is a current provided by the first bias current source, and the IDset is a current provided by the second bias current source, Ron_sns is the sum of the internal resistance sensed by the internal resistance sensing module, VPK− is a voltage at the charging/discharging negative electrode end of the battery, N is the number of charging internal resistance sensing transistors, M is the number of discharging internal resistance sensing transistors, K1 is the ratio of the width dimension of the charge switch transistor to the charging internal resistance sensing transistor, K2 is the ratio of the width dimension of the discharge switch transistor to the discharging internal resistance sensing transistor, Ron_MC is the internal resistance of the charge switch transistor, and Ron_MD is the internal resistance of the discharge switch transistor.

As an example, when the battery is in the charging state, the charging overcurrent protection threshold is given by $IOverChg = ICset*(N*K1*Ron\_MC + M*K2*Ron\_MD)/(Ron\_MC + Ron\_MD)$; when the battery is in the discharging state, the discharging overcurrent protection threshold is given by $IOverDisChg = IDset*(N*K1*Ron\_MC + M*K2*Ron\_MD)/(Ron\_MC + Ron\_MD)$; where the ICset is a current provided by the first bias current source, and the IDset is a current provided by the second bias current source, N is the number of charging internal resistance sensing transistors, M is the number of discharging internal resistance sensing transistors, K1 is the ratio of the width dimension of the charge switch transistor to the charging internal resistance sensing transistor, K2 is the ratio of the width dimension of the discharge switch transistor to the discharging internal resistance sensing transistor, Ron_MC is the internal resistance of the charge switch transistor, and Ron_MD is the internal resistance of the discharge switch transistor. Optionally, in this example, the number of the charging internal resistance sensing transistors MC_sns is the same as that of the discharging internal resistance sensing transistors MD_sns, i.e., N=M; the ratio of the width of the charging internal resistance sensing transistors MCsns to that of the charge switch transistor MC is the same as the ratio of the width of the discharging internal resistance sensing transistors MDsns to that of the discharge switch transistor MD, i.e., K1=K2. At this time, the charging overcurrent protection threshold IOverChg=ICset*N*K1=1Cset*M*K2, and the discharging overcurrent protection threshold IOverDisChg=IDset*N*K1=IDset*M*K2.

Specifically, as shown in FIG. 3, when the battery is in the charging state, the charging detection voltage VG=O, and the charging reference voltage is given by Vref_C=ICset*Ron_sns+VPK-=ICset*(N*K1*Ron_MC+M*K2*Ron_MD)+VPK-; in the discharging state, the overcurrent signal generation module 300 outputs a charging overcurrent protection signal when the sum of a voltage drop VPK (generated by the charging current flowing through the charge switch transistor MC and the discharge switch transistor MD) and a voltage generated by the first bias current ICset provided by the first bias current source flowing through the internal resistance sensing module 100 is equal to the charging detection voltage VG, i.e., Vref_C=VG=0. That is, when ICset*(N*K1*Ron_MC+M*K2*Ron_MD)+VPK-=0, where VPK-=VG-IOverChg*(Ron_MC+Ron_MD), i.e., ICset*(N*K1*Ron_MC+M*K2*Ron_MD) =IOverChg*(Ron_MC+Ron_MD), the overcurrent signal generation module 300 will output a charging overcurrent protection signal, at which time the charging overcurrent protection threshold IOverChg=ICset*(N*K1*Ron_MC+M*K2*Ron_MD)/(Ron_MC+Ron_MD). At N=M and K1=K2, the charging overcurrent protection threshold IOverChg=ICset*N*K1=ICset*M*K2; at this time, the charging overcurrent protection threshold is only related to the bias current ICset provided by the first bias current source, the number N of the charging internal resistance sensing transistors, and the ratio K1 of the width of the charge switch transistor to that the charging internal resistance sensing transistor, or the charging overcurrent protection threshold is only related to the bias current ICset provided by the first bias current source, the number M of the discharging internal resistance sensing transistors, and the ratio K2 of the width of the discharge switch transistor to that of the discharging internal resistance sensing transistor.

As shown in FIG. 4, when the battery is in the discharging state, the discharging reference voltage is given by Vref_D=IDset*Ron_sns=IDser(N*K1*Ron_MC+M*K2*Ron_MD); in the discharging state, the overcurrent signal generation module 300 outputs a discharging overcurrent protection signal when a voltage drop VPK- (generated by the discharging current flowing through the charge switch transistor MC and the discharge switch transistor MD) is equal to Vref_D; that is, when VPK-=Vref_D, i.e., IOverDisChg*(Ron_MC+Ron_MD)=IDser (N*K1*Ron_MC+M*K2*Ron_MD), the overcurrent signal generation module 300 outputs the discharging overcurrent protection signal. At this time, the discharging overcurrent protection threshold IOverDisChg=IDset* (N*K1*Ron_MC+M*K2*Ron_MD)/(Ron_MC+Ron_MD). At N=M and K1=K2, the discharging overcurrent protection threshold IOverDisChg=IDset*N*K1=IDset*M*K2; at this time, the discharging overcurrent protection threshold is only related to the bias current IDset provided by the second bias current source, the number N of the charging internal resistance sensing transistors, and the ratio K1 of the width of the charge switch transistor to that of the charging internal resistance sensing transistor, or only related to the bias current IDset provided by the second bias current source, the number M of the discharging internal resistance sensing transistors, and the ratio K2 of the width of the discharge switch transistor to that of the discharging internal resistance sensing transistor.

As can be seen, the bias current provided by the bias current source in the IC design can easily achieve a high precision, such as a precision of 3%, or even a precision of 1% when fine-tuned after the package is completed. The size ratio of the charging and discharge switch transistors to their corresponding charging and discharging internal resistance sensing transistors on the same chip can achieve a precision of 2%. Therefore, the charging/discharging overcurrent protection circuit described in this example can achieve a charging overcurrent protection threshold with a precision within 5%.

In summary, the present disclosure provides a charging/discharging overcurrent protection circuit and an overcurrent protection method therefor, which can simultaneously detect the current during the charging/discharging process of the battery, and realize the overcurrent protection for both the charging and discharging processes. During the current detection process, the present disclosure makes use of the working principle of the battery protection system and its own characteristics (i.e., during the high-current application, the charge switch transistor and the discharge switch transistor connected in series in the battery protection system are always in a conduction state at the same time) to detect the current of the series-connected charge switch transistor and discharge switch transistor as a whole, and to accurately sense, using an internal resistance sensing module composed of series-connected charging internal resistance sensing transistors and discharging internal resistance sensing transistors, the different internal resistances of the serial charging and discharge switch transistors integrated on the same wafer due to varying factors such as drive voltage, temperature, and process variations. A reference voltage generated by a preset and accurate built-in bias current flowing through the internal resistance sensing module serves as a comparison voltage for overcurrent detection, thereby exponentially increasing the magnitude of the detection voltage and facilitating the requirement for higher precision current detection. At the same time, by using the same internal resistance sensing module in the two states of charging and discharging, the current detection protection for the two states of charging and discharging can be realized through switching and simple logic control, which greatly saves the chip area occupied by the internal resistance sensing module; moreover, the present disclosure uses internal resistance sensing instead of current sensing, which further simplifies the design and saves cost. Moreover, in practical application, the internal resistance sensing module, the voltage selection module and the overcurrent signal generation module of the charging/discharging overcurrent protection circuit described in the present disclosure can be integrated on the same wafer as the charge/discharge switch transistors in the battery protection system, thereby reducing the size of the PCB and improving the system integration, which in turn improves the production efficiency of the battery protection system. It can be seen that the charging/discharging overcurrent protection circuit described in the present disclosure has high integration, occupies small space inside the battery, has few peripheral devices, has good performance and high precision, and can better meet the demand for high battery safety under the current situation of large battery capacity and high charging/discharging current. Therefore, the present disclosure effectively overcomes various shortcomings in the existing technology and has high industrial utilization value.

The above-mentioned embodiments are merely illustrative of the principle and effects of the present disclosure instead of limiting the present disclosure. Modifications or variations of the above-described embodiments may be made by those skilled in the art without departing from the spirit and scope of the disclosure. Therefore, all equivalent modifications or changes made by those who have common knowledge in the art without departing from the spirit and technical concept disclosed by the present disclosure shall be still covered by the claims of the present disclosure.

What is claimed is:

1. A charging/discharging overcurrent protection circuit, comprising:
    an internal resistance sensing module, connected to two ends of a charge switch transistor and a discharge switch transistor connected in series in a battery protection system, for sensing a total internal resistance of the charge switch transistor and the discharge switch transistor connected in series according to a preconfigured ratio when a battery is in a charging state, and sensing a total internal resistance of the charge switch transistor and the discharge switch transistor connected in series according to a preconfigured ratio when the battery is in a discharging state;
    a voltage selection module, connected to the internal resistance sensing module, for switching between different links based on a voltage gating switch so as to be connected to the internal resistance sensing module, to output a charging detection voltage and a charging reference voltage when the battery is in the charging state, and output a discharging detection voltage and a discharging reference voltage when the battery is in the discharging state;
    wherein the charging detection voltage is generated when a charging current flows through the charge switch transistor and the discharge switch transistor connected in series, the charging reference voltage is a sum of a voltage generated when a first bias current flows through the internal resistance sensing module and a voltage at a battery charging/discharging negative electrode end, the discharging detection voltage is generated when a discharging current flows through the charge switch transistor and the discharge switch transistor connected in series, and the discharging reference voltage is generated when a second bias current flows through the internal resistance sensing module; and
    an overcurrent signal generation module, connected to the voltage selection module, for switching between different inputs based on an input gating switch, so as to compare the charging detection voltage with the charging reference voltage when the battery is in the charging state, and generate a charging overcurrent protection signal when the charging detection voltage is not less than the charging reference voltage; and to compare the discharging detection voltage with the discharging reference voltage when the battery is in the discharging state, and generate a discharging overcurrent protection signal when the discharging detection voltage is not less than the discharging reference voltage.

2. The charging/discharging overcurrent protection circuit according to claim 1, wherein the internal resistance sensing module includes: N series-connected charging internal resistance sensing transistors connected to the charge switch transistor and M series-connected discharging internal resistance sensing transistors connected to the discharge switch transistor; wherein the charging internal resistance sensing transistors and the discharging internal resistance sensing transistors are connected in series; wherein the ratio of a width of the charging internal resistance sensing transistor to that of the charge switch transistor is 1/K1, the ratio of a width of the discharging internal resistance sensing transistor to that of the discharge switch transistor is 1/K2, and N, M, K1, and K2 are all positive numbers greater than or equal to 1.

3. The charging/discharging overcurrent protection circuit according to claim 2, wherein the number of the charging internal resistance sensing transistors is the same as that of the discharging internal resistance sensing transistors.

4. The charging/discharging overcurrent protection circuit according to claim 3, wherein the ratio of the width of the charging internal resistance sensing transistor to that the charge switch transistor is the same as the ratio of the width of the discharging internal resistance sensing transistor to that the discharge switch transistor.

5. The charging/discharging overcurrent protection circuit according to claim 1, wherein the voltage selection module comprises: a first voltage gating switch, a second voltage gating switch, a first bias current source, and a second bias current source; wherein a fixed end of the first voltage gating switch is connected to the internal resistance sensing module; a first gating end of the first voltage gating switch is connected to one end of the first bias current source and also serves as a first output end of the voltage selection module to output the charging reference voltage; a second gating end of the first voltage gating switch is grounded and also serves as a second output end of the voltage selection module to output the charging detection voltage; the other end of the first bias current source is grounded; a fixed end of the second voltage gating switch is connected to the internal resistance sensing module; a first gating end of the second voltage gating switch is connected to one end of the second bias current source and also serves as a third output end of the voltage selection module to output the discharging reference voltage; a second gating end of the second voltage gating switch is connected to a charging/discharging negative electrode end of the battery and also serves as a fourth output end of the voltage selection module to output the discharging detection voltage; the other end of the second bias current source is grounded.

6. The charging/discharging overcurrent protection circuit according to claim 1, wherein the overcurrent signal generation module comprises: a first input gating switch, a second input gating switch, and a comparator; wherein a fixed end of the first input gating switch is connected to a first input end of the comparator, a first gating end of the first input gating switch is connected to a second output end of the voltage selection module, a second gating end of the first input gating switch is connected to a third output end of the voltage selection module, a fixed end of the second input gating switch is connected to a second input end of the comparator, a first gating end of the second input gating switch is connected to a first output end of the voltage selection module, a second gating end of the second input gating switch is connected to a fourth output end of the voltage selection module, and an output end of the comparator serves as an output end of the overcurrent signal generation module.

7. A charging/discharging overcurrent protection method implemented using the charging/discharging overcurrent protection circuit according to claim 1, wherein the charging/discharging overcurrent protection method comprises:
when the battery is in a charging state, sensing, via the internal resistance sensing module, the sum of the internal resistances of the charge switch transistor and the discharge switch transistor connected in series according to a preconfigured ratio; switching, via the voltage selection module, between different links based on a voltage gating switch, to output the charging detection voltage and the charging reference voltage; switching, via the overcurrent signal generation module, between different inputs based on an input gating switch, so as to compare the charging detection voltage with the charging reference voltage, and generate a charging overcurrent protection signal when the charging detection voltage is not less than the charging reference voltage; and when the battery is in the discharging state, sensing, via the internal resistance sensing module, the sum of the internal resistances of the charge switch transistor and the discharge switch transistor connected in series according to a preconfigured ratio; switching, via the voltage selection module, between different links based on a voltage gating switch, to output the discharging detection voltage and the discharging reference voltage; switching, via the overcurrent signal generation module, between different inputs based on an input gating switch, so as to compare the discharging detection voltage with the discharging reference voltage, and generate a discharging overcurrent protection signal when the discharging detection voltage is not less than the discharging reference voltage.

8. The charging/discharging overcurrent protection method according to claim 7, wherein when the battery is in the charging/discharging state, the sum of internal resistances sensed by the internal resistance sensing module is given by $Ron\_sns = N*Ron\_MCsns + M*Ron\_MDsns = N*K1*Ron\_MC + M*K2*Ron\_MD$; wherein N is the number of the charging internal resistance sensing transistors, M is the number of the discharging internal resistance sensing transistors, Ron_MCsns is an internal resistance of a single charging internal resistance sensing transistor, Ron_MDsns is an internal resistance of a single discharging internal resistance sensing transistor, K1 is the ratio of width dimension of the charge switch transistor to the charging internal resistance sensing transistor, K2 is the ratio of width dimension of the discharge switch transistor to the discharging internal resistance sensing transistor, Ron_MC is an internal resistance of the charge switch transistor, and Ron_MD is an internal resistance of the discharge switch transistor.

9. The charging/discharging overcurrent protection method according to claim 7, wherein when the battery is in the charging state, the charging reference voltage is given by $Vref\_C = ICset*Ron\_sns + VPK- = ICset*(N*K1*Ron\_MC + M*K2*Ron\_MD) + VPK-$; when the battery is in the discharging state, the discharging reference voltage is given by $Vref\_D = IDset*Ron\_sns = IDset*(N*K1*Ron\_MC + M*K2*Ron\_MD)$; wherein the ICset is a current provided by the first bias current source, and the IDset is a current provided by the second bias current source, Ron_sns is the sum of the internal resistances sensed by the internal resistance sensing module, VPK- is a voltage at the charging/discharging negative electrode end of the battery, N is the number of the charging internal resistance sensing transistors, M is the number of the discharging internal resistance sensing transistors, K1 is the ratio of width dimension of the charge switch transistor to the charging internal resistance sensing transistor, K2 is the ratio of the width of the discharge switch transistor to that of the discharging internal resistance sensing transistor, Ron_MC is an internal resistance of the charge switch transistor, and Ron_MD is an internal resistance of the discharge switch transistor.

10. The charging/discharging overcurrent protection method according to claim 7, wherein when the battery is in the charging state, a charging overcurrent protection threshold is given by $IOverChg = ICset*(N*K1*Ron\_MC + M*K2*Ron\_MD)/(Ron\_MC + Ron\_MD)$; when the battery is in the discharging state, a discharging overcurrent protection threshold is given by $IOverDisChg = IDset*(N*K1*Ron\_MC + M*K2*Ron\_MD)/(Ron\_MC + Ron\_MD)$; wherein the ICset is a current provided by the first bias current source, and the IDset is a current provided by the second bias current source, N is the number of the charging internal resistance sensing transistors, M is the number of the discharging internal resistance sensing transistors, K1 is the ratio of width dimension of the charge switch transistor to the charging internal resistance sensing transistor, K2 is the ratio of width dimension of the discharge switch transistor to the discharging internal resistance sensing transistor, Ron_MC is an internal resistance of the charge switch transistor, and Ron_MD is an internal resistance of the discharge switch transistor.

* * * * *